United States Patent [19]

Cook

[11] Patent Number: 5,439,567
[45] Date of Patent: Aug. 8, 1995

[54] PROCESS FOR TREATMENT OF A FLUID AND APPARATUS THEREFOR

[76] Inventor: Brian G. Cook, 44-131 Berkley Road, St. Catharines, Ontario, Canada, L2M 6W6

[21] Appl. No.: 262,666

[22] Filed: Jun. 20, 1994

[51] Int. Cl.$^6$ ............................................. C02F 1/461
[52] U.S. Cl. ................................. 204/149; 204/152; 204/269; 204/272; 204/275; 204/276; 210/748; 588/204
[58] Field of Search ............... 204/149, 152, 269, 272, 204/275, 276; 210/748; 588/204

[56] References Cited

U.S. PATENT DOCUMENTS

| | | | |
|---|---|---|---|
| 3,530,051 | 9/1970 | Ueda et al. | 204/149 |
| 3,900,377 | 8/1975 | Enns et al. | 204/149 |
| 3,933,606 | 1/1976 | Harms | 204/152 |
| 5,108,563 | 4/1992 | Cook | 204/152 |

Primary Examiner—John Niebling
Assistant Examiner—Arun S. Phasge
Attorney, Agent, or Firm—Fitzpatrick, Cella, Harper & Scinto

[57] ABSTRACT

A process for treatment of a fluid in need of treatment. The process comprising the steps of: (i) feeding the fluid in need of treatment to a fluid treatment chamber having a fluid inlet and a fluid outlet; (ii) passing the fluid in need of treatment through the fluid inlet into the treatment chamber; (iii) forcing the fluid in need of treatment through at least one fluid permeable electrolytic cell disposed substantially transverse to flow of the fluid, the electrolytic cell comprising a channel defined by an outer, perforated first electrode and an inner, coaxially disposed second electrode; (iv) subjecting the fluid in need of treatment to electrolysis as it passes through the channel; (v) forcing the fluid to the fluid outlet; and (vi) allowing the fluid to exit the fluid outlet. The invention also provides a fluid treatment apparatus comprising a housing including a fluid inlet, a fluid outlet and at least one fluid permeable electrolytic cell disposed therebetween such that the flow of fluid from the fluid inlet to the fluid outlet is substantially transverse to the at least electrolytic cell, the at least one electrolytic cell comprising a channel defined by an outer, perforated first electrode and an inner, coaxially disposed second electrode. Ideally the process and apparatus are suited for treatment of water containing pollutants to effect a substantial reduction in the concentration of the pollutants.

40 Claims, 7 Drawing Sheets

PROCESS FOR TREATMENT OF A FLUID AND APPARATUS THEREFOR

BACKGROUND OF THE INVENTION

1. Field of the Invention

The present invention relates to a process for treatment of a fluid and to an apparatus therefor. More particularly, the present invention relates to a water treatment process for effecting a reduction in the concentration of pollutants in the fluid and to an apparatus therefor.

2. Description of the Prior Art

The treatment of fluids generally, and water in particular, to remove pollutants therefrom is a continually developing art. Development is motivated, at least in part, by the recognition that the increasing world population necessitates an increased access to water which is pollutant-reduced or substantially pollutant-free.

Generally, water pollutants can be grouped in seven classes as follows:

1. Sewage and other oxygen-demanding wastes
2. Infectious agents
3. Plant nutrients
4. Exotic Organic chemicals
5. Inorganic minerals and chemical compounds
6. Sediments
7. Radioactive substances Sewage and other oxygen-demanding wastes are generally carbonaceous organic materials that can be oxidized biologically (or sometimes chemically) to carbon dioxide and water. These wastes are problematic since: (i) degradation thereof leads to oxygen depletion, which affects (and can even kill) fish and other aquatic life; (ii) they produce annoying odours; (iii) they impair domestic and livestock water supplies by affecting taste, odour and colour thereof; and (iv) they may lead to scum and solids that render water unfit for recreational use.

Infectious agents are usually found in waste water from municipalities, sanatoriums, tanning and slaughtering plants and boats. This type of pollutant is capable of producing disease in man and animals, including livestock.

Plant nutrients, (e.g. nitrogen and phosphorus) are capable of stimulating the growth of aquatic plants, which interfere with water uses and which later decay to produce annoying odours and increase the amount of oxygen-demanding waste in the water (see above).

Exotic organic chemicals include surfactants used in detergents, pesticides, various industrial products and the decomposition products of other organic compounds. Some of these compounds are known to be toxic to fish at very low concentrations. Many of these compounds are not readily biologically degradable.

Inorganic minerals and chemical compounds are generally found in water from municipal and industrial waste waters and from urban runoff. These pollutants can kill or injure fish and other aquatic life, and can also interfere with the suitability of water for drinking or industrial use. A prominent example is the occurrence of mercury in water. Another example is salt pollution from NaCl and $CaCl_2$ used to de-ice roads in winter in the northern, colder climates.

Sediments are soil and mineral particles washed from the land by storms and floodwaters, from croplands, unprotected forest soils, overgrazed pastures, strip mines, roads and bulldozed urban areas. Sediments fill stream channels and reservoirs; erode power turbines and pumping equipment, reduce the amount of sunlight available to aquatic plants; plug water filters; and blanket fish nests, spawn, and food supplies, thereby reducing the fish and shell fish populations.

Radioactive substances in water environments usually result from the wastes of uranium and thorium mining and refining; from nuclear power plants and from industrial, medical, scientific utilization of radioactive materials.

While the prior art is replete with processes and apparatus for treatment of water, a particularly advantageous process and apparatus for treating water containing pollutants is disclosed in U.S. Pat. No. 5,108,563, the contents of which are hereby incorporated by reference. This patent describes electrolytic treatment of water using an electrode comprising a particular arrangement of electrodes.

Whereas the process and apparatus disclosed in the '563 patent have attained a certain degree of success, it would be desirable if the design could be optimized to improve the efficiency of water throughput without substantially compromising reduction of the pollutants contained in the water.

SUMMARY OF THE INVENTION

It is an object of the present invention to provide a novel process for treatment of a fluid.

It is another object of the present invention to provide a novel apparatus for treatment of a fluid.

Accordingly, in one of its aspects, the present invention provides a process for treatment of a fluid in need of treatment, the process comprising the steps of:

(i) feeding the fluid in need of treatment to a fluid treatment chamber having a fluid inlet and a fluid outlet;
(ii) passing the fluid in need of treatment through the fluid inlet into the treatment chamber;
(iii) forcing the fluid in need of treatment through at least one fluid permeable electrolytic cell disposed substantially transverse to flow of the fluid, the electrolytic cell comprising a channel defined by an outer, perforated first electrode and an inner, coaxially disposed second electrode;
(iv) subjecting the fluid in need of treatment to electrolysis as it passes through the channel;
(v) forcing the fluid to the fluid outlet; and
(vi) allowing the fluid to exit the fluid outlet.

In another of its aspects, the present invention provides a fluid treatment apparatus comprising a housing including a fluid inlet, a fluid outlet and at least one fluid permeable electrolytic cell disposed therebetween such that the flow of fluid from the fluid inlet to the fluid outlet is substantially transverse to the at least electrolytic cell, the at least one electrolytic cell comprising a channel defined by an outer, perforated first electrode and an inner, coaxially disposed second electrode.

BRIEF DESCRIPTION OF THE DRAWINGS

Embodiments of the present invention will be described with reference to the accompanying drawings, in which.

DETAILED DESCRIPTION OF THE PREFERRED EMBODIMENTS

Figure 1:
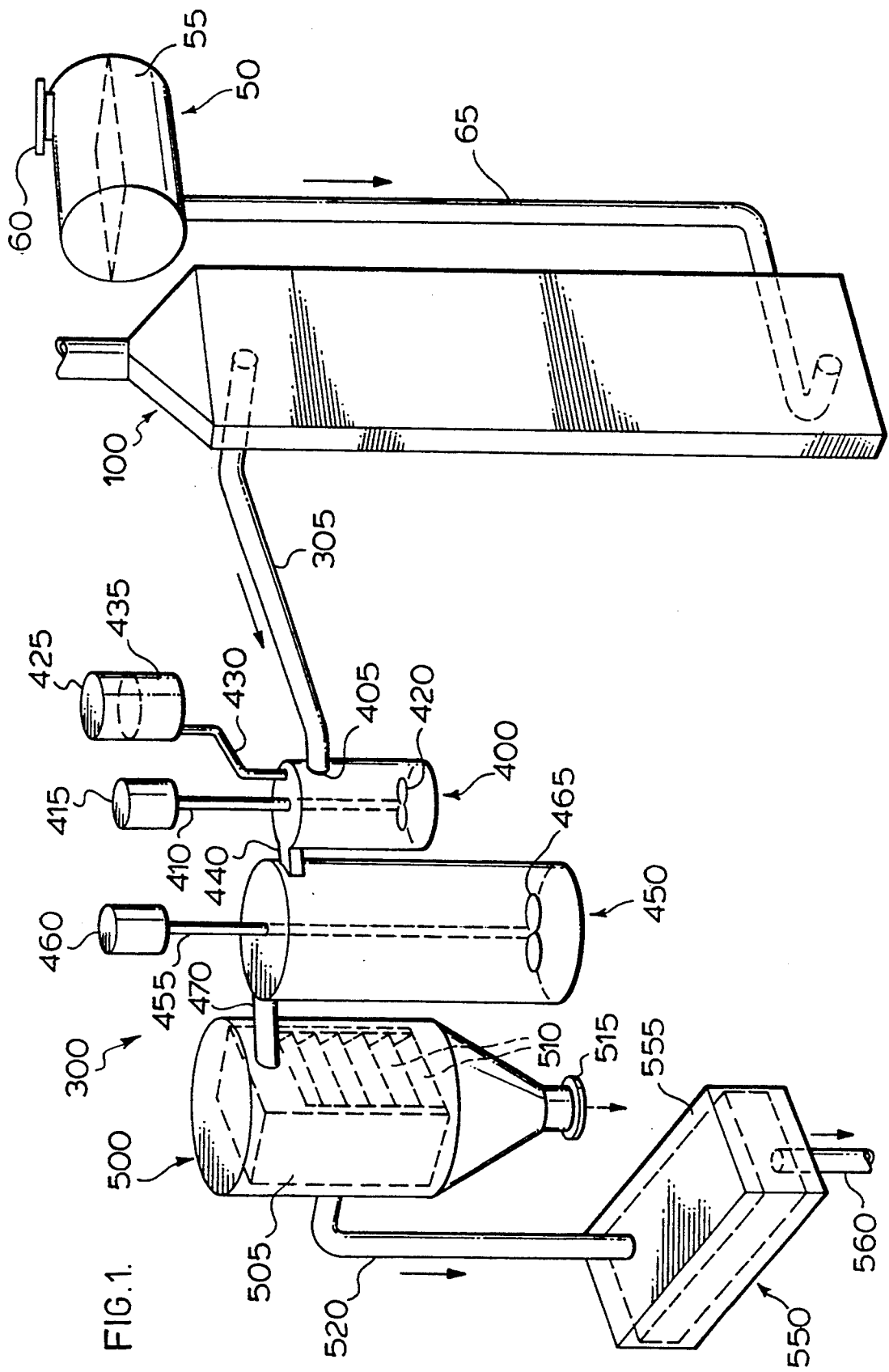
FIG. 1 illustrates a perspective view of a fluid treatment system including, inter alia, the apparatus of the present invention.
Figure 2:
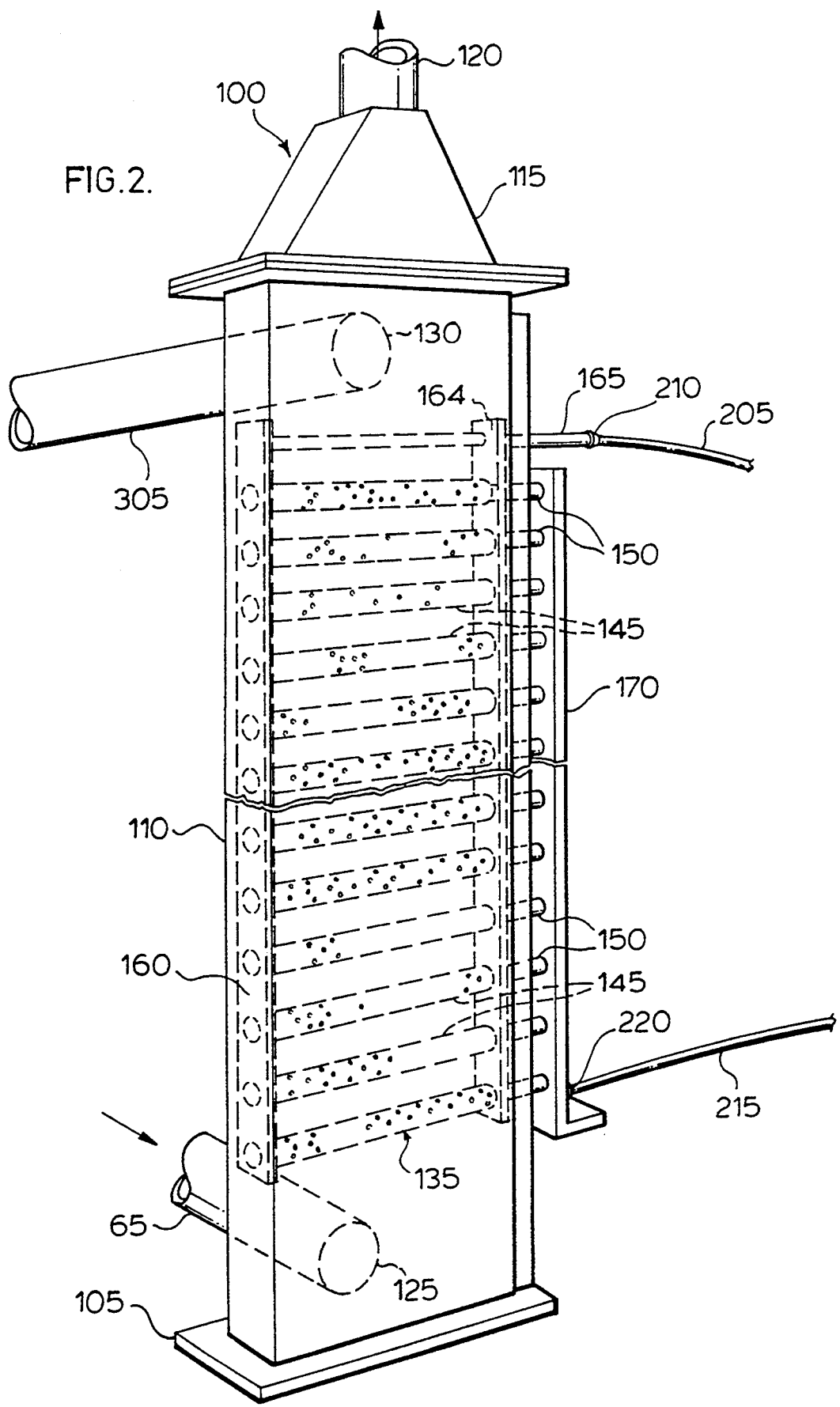
FIG. 2 illustrates a perspective view of the apparatus of the present invention.

In general, the present invention relates to a process and apparatus for electrolytic treatment of a fluid in need of treatment. As used throughout this specification, the term "a fluid in need of treatment" is intended to encompass any fluid containing a substance or pollutant the concentration of which must be substantially reduced or even eliminated. Typically such a fluid will be water containing one or more pollutants although the invention is equally applicable to other fluids.

As used throughout this specification, the term "electrolysis" is meant to encompass passage of electricity through a fluid to provide sufficient energy to cause an otherwise non-spontaneous reduction-oxidation (hereinafter referred to as "redox") reaction. Moreover, as used throughout this specification, the term "electrolyte" is meant to encompass substances which dissociate in solution to produce ions thereby enabling the solution to conduct electricity.

The present process and apparatus may be advantageously utilized for treating water. The term "treating water" is meant to encompass treatments such as deposition of metals, microbiological load reductions, purification of industrial waste effluents (non-limiting examples include mine water effluent, smelting operations effluent, electroplating effluent, pulp and paper effluent), municipal sewage treatment effluent and the like.

Moreover, the present process can be used to decompose, without pre-extraction, organo-chlorine and -chloride compounds such as polychlorinated biphenyl's (PCB's), dioxins and furans, and organo-bromine and -bromide compounds such as polybrominated biphenyls (PBB's), known to be detrimental to the environment. To the Applicant's knowledge, the only manner by which, for example, PCB's can be decomposed effectively and on a commercial scale is by extraction from the effluent (if necessary) followed by thermal treatment at extremely high temperatures (e.g. 1500° C. and higher). Unfortunately, the furnace required to operate such a process is very expensive to construct and to operate. Further, decomposition of PCB's in this manner often leads to another pollution problem, namely that of air by the products of decomposition. Still further, the operation of such a furnace must be monitored very carefully to ensure that temperature drops do not occur and result in emission of the toxic by-products (i.e. incomplete destruction) of the PCB's.

In accordance with one aspect of the invention, fluid in need of treatment is introduced into a fluid treatment chamber comprising a fluid permeable electrolytic cell. The electrolytic cell comprises an outer, perforated first electrode which is spaced from and at least partially encompasses an inner, coaxially disposed second electrode. Thus, one electrode functions as an anode whereas the other electrode functions as a cathode. It is not particularly important whether the first electrode functions as an anode or as a cathode. It is preferred that the cathode be the first electrode and the anode be the second electrode.

In another, and preferred, embodiment, the first and second electrodes are each elongate. The shape of the cross-section of the first and second electrodes is not particularly restricted, nor need the second electrode be solid. Of course, it is within the scope of the invention to utilize electrolytic cells comprising various cross-sectional shapes from cell to cell or even within a given cell. It is convenient and preferred that each electrolytic cell be of the same construction and dimension. Thus, is possible for cross-sectional shape of the first electrode and/or the second electrode to be circular, triangular, square, rectangular, hexagonal and the like.

Preferably, the cross-section of the first and second electrodes is substantially circular. In this embodiment it is preferred that the ratio of the diameter of the first electrode to the diameter of the second electrode be in the range of from about 1.10 to about 3.50, more preferably from about 1.10 to about 1.75, most preferably from about 1.10 to about 1.30.

This preferred embodiment relating to the ratio of the diameter of the first electrode to the diameter of the second electrode also is applicable to electrodes having the same, non-circular cross-section. In this scenario, the diameters use for the calculation of the ratio should be congruent (i.e. the diameter of the first electrode and that of the second electrode should be overlayed).

With reference to FIG. 1, there is illustrated a system 300 for treatment of a fluid in need of treatment. The system comprises a fluid holding tank 50 which serves to hold fluid in need of treatment 55. Fluid holding tank 50 comprises an inlet 60 through which fluid in need of treatment 55 may be dispensed into fluid holding tank 50. Fluid holding 50 further comprises an outlet (not shown) which is sealingly attached to a suitable connecting pipe 65 which serves to connect fluid holding tank 50 to a fluid treatment chamber 100 which will be discussed in more detail herein below.

Fluid treatment chamber 100 is connected to a pre-coagulation tank 400 via a connecting pipe 305 which is disposed between an outlet (not shown in FIG. 1 ) of fluid treatment chamber 100 (discussed hereinbelow) and an inlet 405 of pre-coagulation tank 400.

Pre-coagulation tank 400 includes a mechanical stirrer 410 which comprises a motor 415 and an impeller 420. Pre-coagulation tank 400 is connected to a remote coagulant holding tank 425 via a suitable connecting pipe 430. Coagulant holding tank 425 contains a suitable coagulant 435 and may comprise a valve (not shown) for regulating the amount of coagulant 435 introduced into pre-coagulation tank 400.

Pre-coagulation tank 400 is connected to a main coagulation tank 450 via a connecting passage 440 disposed between pre-coagulation tank 400 and main coagulation tank 450. Main coagulation tank 450 includes a mechanical stirrer 455 which comprises a motor 460 and an impeller 465.

Main coagulation tank 450 is connected to a settling tank 500 via a connecting pipe 470. Settling tank 500 comprises a module 505 in which there is disposed a plurality of fins 510. Settling tank 500 further comprises a floc residue outlet to permit withdrawal of settled floc on a periodic and/or continuous basis.

Settling tank 500 is connected to a filtration unit 550 via a connecting pipe 520. Filtration unit 550 includes a filtration module 555 which may comprise one or more of sand, activated charcoal, charcoal, anthracite and the like to remove any finely suspended particulates not removed previously. Filtration unit 550 further comprises an outlet 560 through which the treated fluid exits system 300.

As will be apparent to those of skill in the art, connecting pipes 65, 305, 430, 470 and 520, connecting passage 440 and outlet 560 are sealingly attached to the various tanks and units in system 300. The manner of perfecting the seal is not particularly restricted and is within the purview of a person skilled in the art.

In operation, fluid in need of treatment 55 is fed by any suitable means (not shown; e.g. a pump, gravity, etc.) to the inlet of fluid treatment chamber 100 wherein it is treated as will be described in more detail hereinbelow. Fluid emanates from fluid treatment chamber 100 via connecting pipe 305 and enters pre-coagulation tank 400 wherein it is mixed with coagulant 435. The choice of coagulant is not particularly restricted. A non-limiting example of a suitable coagulant is commercially available from Allied Colloid under the tradename Percol LT20 (Food Grade). The fluid/coagulant mixture exits pre-coagulation tank 400 via connecting passage 440 and enters main coagulation tank 450 which allows for mixing of the fluid and coagulant 435 for an extended period after which the mixture exits from main coagulation tank 450 via connecting pipe 470 and enters settling tank 500. In settling tank 500, the coagulated floc in the fluid settles to the bottom of settling tank 500 wherein it is removed via floc residue outlet 515.

As will be apparent to those of skill in the art, the result of mixing fluid and coagulant is that a substantial portion of any precipitated material contained in the mixture will agglomerate physically to provide a coagulated floc. This coagulated floc is prone to settling and the result is that substantially all precipitated material (i.e. up to about 98% by weight) emanating from main coagulation tank 450 may be separated from the fluid in settling tank 500. The choice and design of settling tank 500 is within the purview of a person skilled in the art. Suitable settling tanks are commercially available from Eimco Limited and many other suppliers.

Fluid exits settling tank 500 via connecting pipe 520 and enters filtration unit 550 wherein any finely suspended particulates or other materials (if present) are removed from the fluid which then exits via outlet 560. Filtration module 555 can be a replaceable module which can be changed when fully loaded with suspended material and the like. Alternatively, filtration module 555 can be permanent and suitably adapted (not shown) so that, upon substantially complete loading thereof, backwashing could be effected thereby unloading the filtered material. The fluid emanating from filtration unit 550 is substantially or completely free of floc and pollutants which may have been present in fluid in need of treatment 55.

With reference to FIGS. 2–8, the design and operation of fluid chamber 100 will now be described in more detail.

Thus, fluid chamber 100 comprises a base 105, a housing 110, a hood 115 and a vent 120. Housing 110 comprises a fluid inlet 125 and a fluid outlet 130. Within housing 110 there is disposed a plurality of electrolytic cells 135.

Each electrolytic cell 135 is permeable and comprises a channel 140 defined by an outer, first electrode 135 and an inner, coaxially disposed second electrode 150. First electrode 145 comprises a plurality of perforations 155 which renders electrolytic cell 135 permeable to fluid flowing through housing 110 in a direction substantially transverse to the disposition of electrolytic cells 135.

Figure 3:
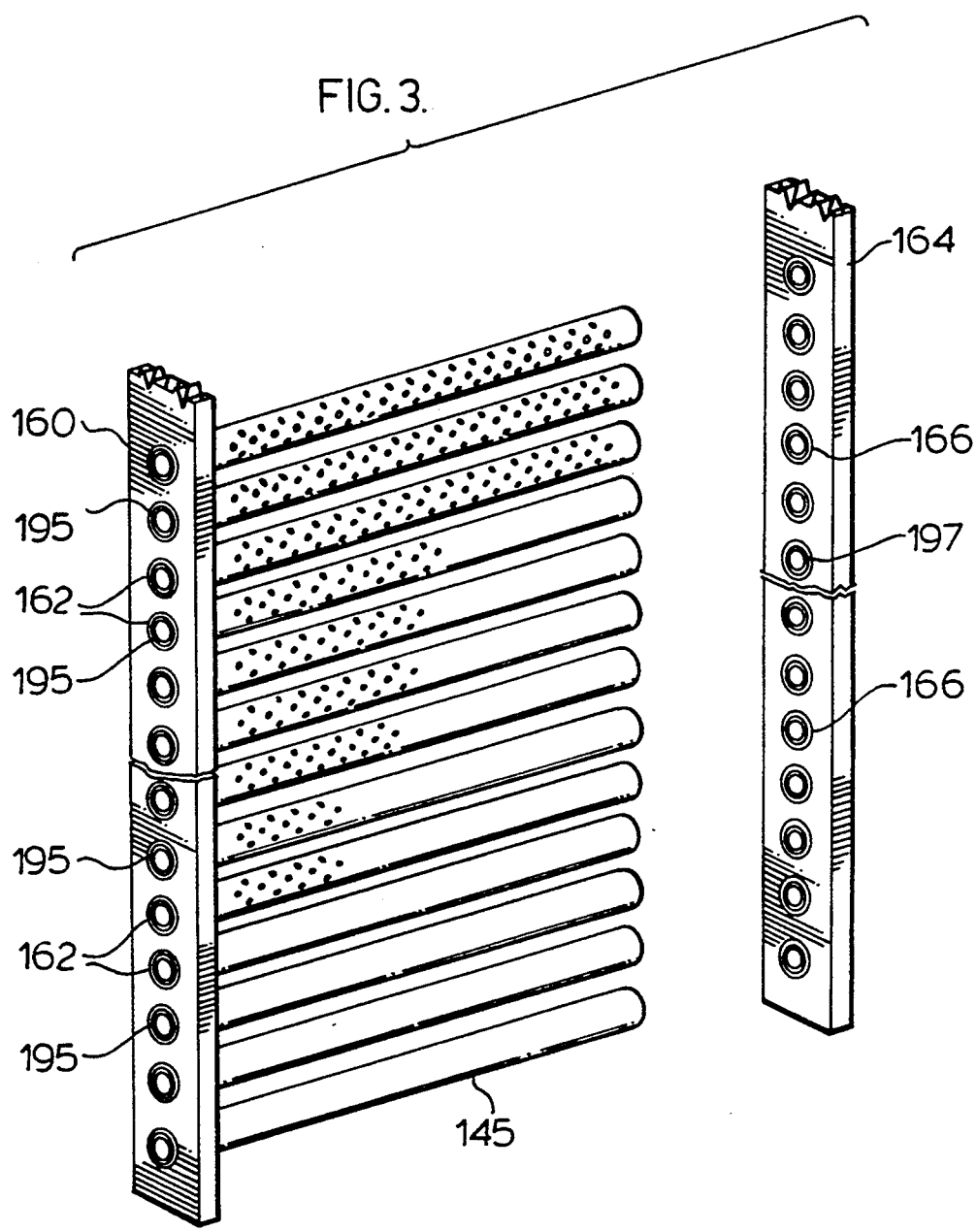
FIGS. 3-5 illustrate a partial perspective view of the assembly of a portion of the apparatus illustrated in FIG. 2.
Figure 4:
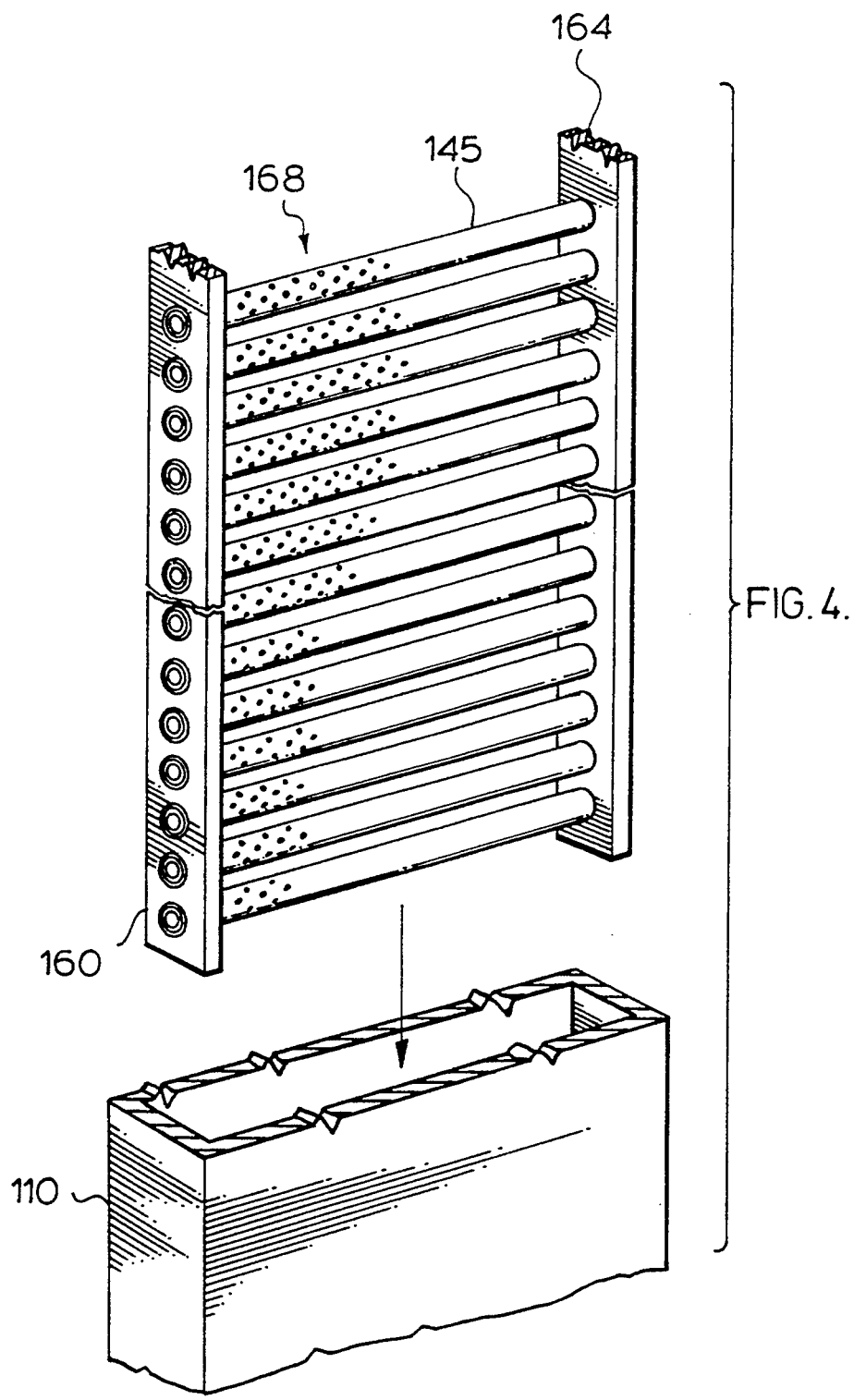
Figure 5:
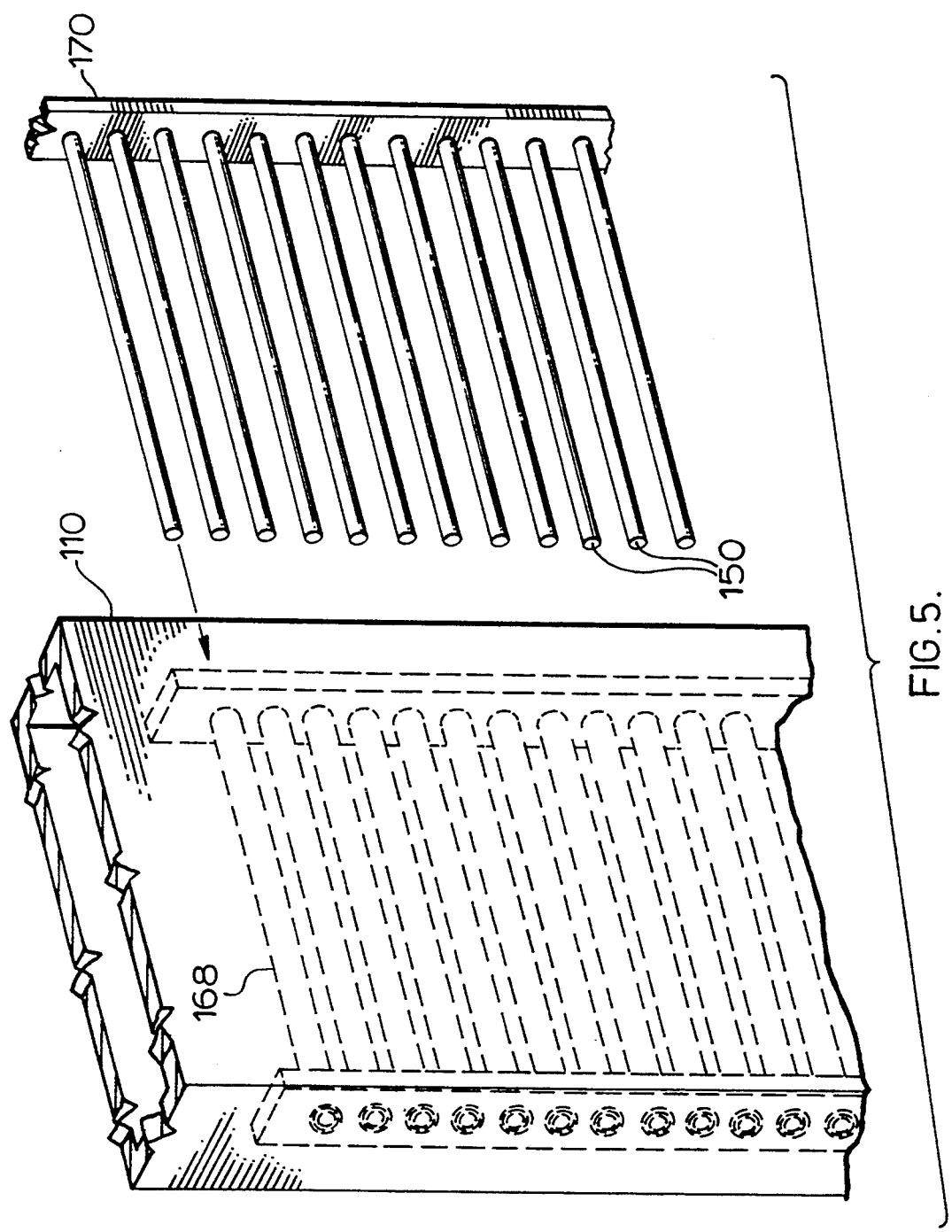

First electrodes 145 are mounted to a single, electrically conductive first mounting bar 160 to which is connected an electrically conductive first pin 165. First electrodes 145 and first pin 165 may be affixed to first mounting bar 160 by an suitable means. Preferably, first electrodes 145 are pressure or press fitted to first mounting bar 160. This may be accomplished by use of a first bushing 195 or other suitable spacer disposed in each of a plurality of first openings 162 in first mounting bar 160. Each of first electrodes 145 is then pressure or press fitted into first openings 162, preferably such that the outer edge thereof is substantially flush with the outer surface of first mounting bar 160. A second mounting bar 164 with a plurality of second openings 166 is pressure or press fitted to the opposite end of first electrodes 145 as depicted in FIGS. 3 and 4. This may be accomplished by use of a second bushing 197 or other suitable spacer disposed in each second openings 164 in second mounting bar 160. The result is a "ladder" construction 168 depicted in FIG. 4 made up of first mount bar 160, second mounting bar 164 and first electrodes 145 (for clarity, first pin 165 is not depicted in FIGS. 3–5).

Of course it will be apparent to those of skill in the art that, as an alternative to pressure or press fitting of the first electrodes in the two mounting bars, if all materials are made of stainless steel, first electrodes 145 and first pin 165 may be welded or otherwise affixed to first mounting bar 160.

Second electrodes 150 are affixed to an electrically conductive third mounting bar 170 by any suitable means. If second electrodes 150 are designed to be used as sacrificial electrodes, it is preferred that they be mounted to third mounting bar 170 in such a manner that they can be readily replaced.

Electrolytic cells 135 are formed as follows.

Hood 115 is removed from housing 110 and "ladder" construction 168 (comprising first mounting bar 160, first pin 165, second mounting bar 164 and first electrodes 145) is disposed and mounted by any suitable means (not shown) within housing 110. Thereafter, second electrodes 150, which are affixed to third mounting bar 170 and are arranged complementary to first electrodes 145, are inserted through a plurality of third openings 175 in housing 110. As is clearly evident from FIGS. 5–7, a third opening 175 is provided for each second electrode 150. Further, each second electrode 150 is coaxially disposed with respect to first electrode 145.

In order to seal openings 175, a pair of O-rings 180, 185 are disposed in each third opening 175 between second electrode 150 and housing 110. In the event that housing 110 is made of an electrically conductive material, 0-rings 180,185 should be made of an electrically non-conductive material such as rubber, teflon and the like. Further, it will be evident to those of skill in the art that first bushing 195 and second bushing 197 also should be made of an electrically non-conductive material.

Figure 6:
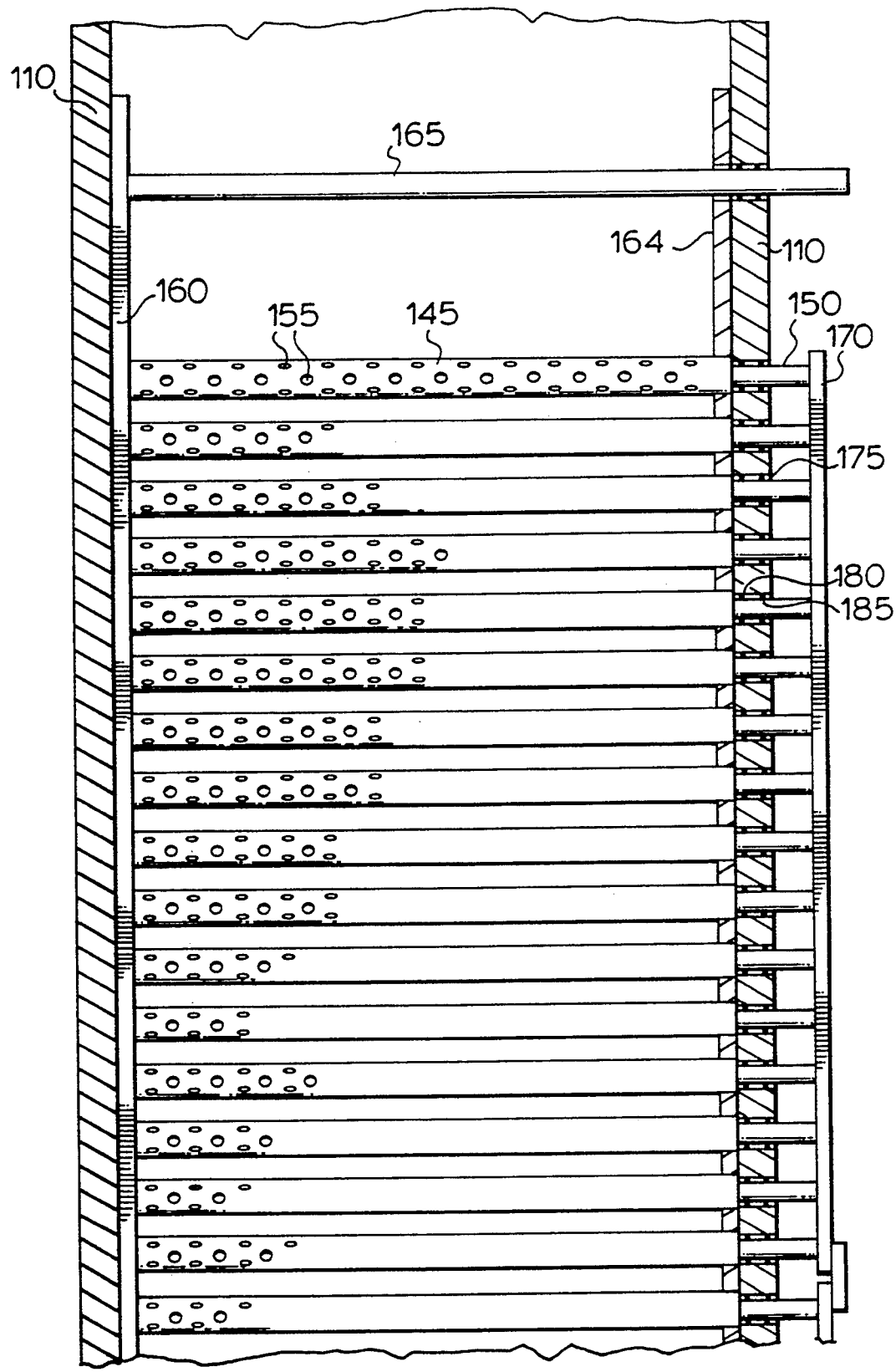
FIG. 6 illustrates a front elevation of the interior of the apparatus illustrated in FIG. 2.
Figure 7:
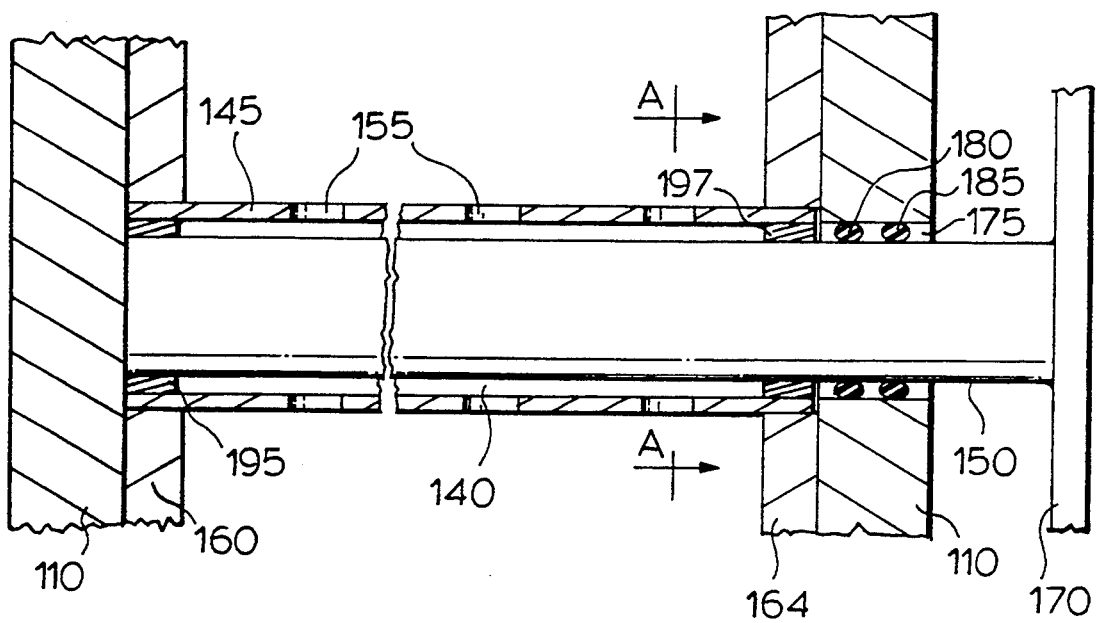
FIG. 7 illustrates an enlarged view of an electrolytic cell contained in the apparatus illustrated in FIG. 6.
Figure 8:
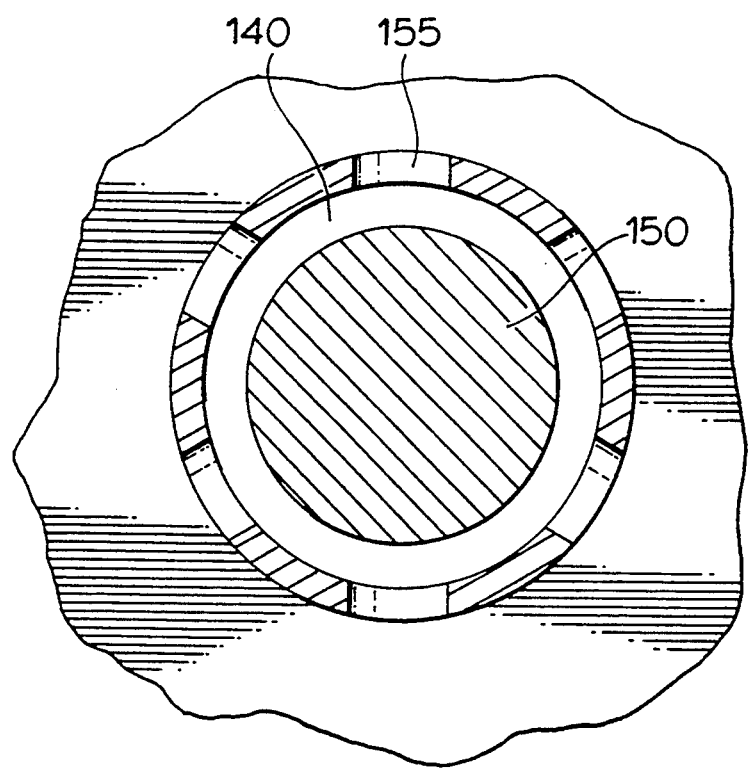
FIG. 8 is a sectional view along line A—A in FIG. 7.

With reference to FIGS. 6 and 7, it will be seen that first bushing 195 and second bushing 197 serve to maintain a uniform annular dimension for channel 140. Of course, it will be readily appreciated by those of skill in the art that additional similar bushings or spacers can be used, for example when the long electrodes are used.

First mounting bar 160 having attached thereto first electrodes 145 is connected to a suitable source of electricity (not shown) by a first wire 205 via a suitable first electrical connection 210. Similarly, third mounting bar 170 having affixed thereto second electrodes 150 is connected to a suitable source of electricity (not shown) by a second wire 215 via a second electrical connection 220.

In operation, fluid to be treated 55 and a suitable electrolyte are introduced via fluid inlet 125 into housing 110 by a pump (not shown) or any other suitable means. Current is supplied to first wire 205 and second wire 215. As fluid in need of treatment is pumped into housing 110, it moves generally upward through electrolytic cells 135 and toward fluid outlet 130. As the fluid passes through each electrolyte cell 135 it is electrolyzed in channel 140. The current applied to the electrolytic cells 135 is not particularly restricted. Preferably, the current electrolytic cells 135 is in the range of from about 250 to about 5000 milliamps per electrolytic cell.

Depending on the nature of the fluid to be treated and/or the impurities contained therein, a precipitate or floc may be formed in the fluid. If this occurs the fluid may subjected to a post-treatment, preferably as discussed hereinabove with reference to FIG. 1.

Depending on the nature of the fluid being treated, it quite likely that large amounts of gas will be formed. These gases may be discharged from fluid chamber 100 via vent 120, possibly to a gas scrubbing unit (not shown) or other gas treatment unit, if necessary.

The composition of the first and second electrodes is not particularly restricted provided the electrodes are capable of functioning as such in an electrolytic cell. Non-limiting examples of materials suitable for use as first and second electrodes include AISI Types and L 304 (carbon content typically 0.08 percent by weight) and 317L (carbon content typically 0.03 percent by weight) stainless steel. Preferably, the anode comprises, at least partially, iron.

The electrolyte suitable for use in the invention is not particularly restricted. Preferably the electrolyte is strong (i.e. ionizes substantially completely). Non-limiting examples of strong electrolytes include $HNO_3$, $HClO_4$, $H_2SO_4$, HCl, HI, HBr, $HClO_3$, $HBrO_3$, alkali hydroxides, alkaline earth hydroxides (e.g. calcium hydroxide) and most salts (e.g. calcium chloride and sodium chloride). Preferably, the electrolyte is selected from calcium chloride, sodium chloride, calcium hydroxide and mixtures thereof. The electrolyte may be added in any suitable form. For example, if the electrolyte is a solid, it may be dissolved in the fluid to be treated prior to entry into or while actually in the fluid treatment chamber. Alternatively, the electrolyte may be dissolved and stored as a solution in a separate vessel. The electrolyte solution would then be added, as required, to fluid treatment chamber by any suitable means. If the electrolyte is in the form of a liquid, it may be added, as required, to the fluid treatment chamber either neat or in the form of dilute aqueous solution. As will be appreciated by those of skill in the art, it may not be necessary, in certain instances, to add an electrolyte to the fluid in need of treatment. Specifically, many effluents may inherently contain chemicals and/or pollutants which are capable of acting as an electrolyte. In such instances, addition of a further, separate electrolyte is optional.

As will be apparent to those of skill in the art, fluid treatment chamber 100 defines a "single-pass" for the fluid in need of treatment. By tailoring the number and configuration of electrolytic cells 135 to the particular fluid in need of treatment, fluid treatment 100 provides improved efficiency in the volume of fluids which may be treated when compared to the apparatus disclosed in U.S. Pat. No. 5,108,563.

A particularly preferred aspect of invention relates to forcing the fluid in need of treatment in a direction substantially transverse to the disposition of the electrolytic cells. Most preferably, this is done by disposing the electrolytic cells substantially perpendicular to the flow of fluid and ideally the electrolytic cells are disposed horizontally in the fluid in need of treatment is pumped generally upward through the electrolytic cells (i.e. vertically).

It will be apparent to those of skill in the art that the flow of fluid through the electrolytic cell is "closed". By this it is meant that the interior of the fluid chamber in which electrolysis occurs is closed or completely filled with fluid. This results by virtue of the disposition of the electrolytic cells between the fluid inlet and fluid outlet of the fluid treatment chamber.

As will be understood by those of skill in the art, further variations to the design and use of the fluid treatment chamber described hereinabove are possible without departing from the scope and spirit of the present invention. For example, if the combination of the first electrodes, first mounting bar and second mounting bar is considered as a ladder, it is possible to design the fluid treatment chamber to house a number of such ladders which can be attached to a single mounting bar at each electrode end or a plurality of mounting bars at each electrode end. Further, it is possible to design the fluid treatment chamber such that the electrolytic cells housed therein substantially fill the cross-section of the housing so that the only path of the fluid from the fluid inlet to the fluid outlet is through the electrolytic cells. Still further, it is possible to insert second electrodes into both ends of the housing (i.e. the sum of lengths of each pair of second electrodes is substantially the same as the corresponding first electrode).

Embodiments of the invention will be further described by reference to the following Examples which should not be construed as limiting the scope of the invention:

EXAMPLE 1

An aqueous effluent sample was treated in a fluid treatment chamber similar to the one illustrated in FIGS. 2–8. The effluent sample was obtained from Hamilton Bay, Ontario, Canada.

In particular fluid treatment chamber used, the outer, first electrodes functioned as cathodes while the inner, second electrodes functioned as anodes. Each electrode in the apparatus (i.e. anode and cathode) was 12 inches long. Each anode had a diameter of 0.750 inch and was made of graphite. Each cathode had an internal diameter of 0.875 inch and was made of stainless steel. The distance between each anode and cathode was 0.0625 inch, which defined the channel between the electrodes. Thus, in this Example, the ratio of the diameter of the first electrode to that of the second electrode was 1.167. The power applied to each electrolytic cell was 5000 milliamps or 80 mamps/sq.in.

Effluent was continuously fed to the apparatus at a rate of 4 gallons/minute. This flow rate was determined to correspond to 10 mL/anode inch/minute. The electrolyte used was a 50/50 mixture of sodium chloride and calcium chloride.

The chemical oxygen demand (COD) of the effluent was determined initially and after passing the effluent through a given number of electrolytic cells disposed in the fluid treatment chamber. The COD was determined by oxidizing the organic matter in a sample of the effluent being treated with boiling acidic dichromate solution (APHA Standard Methods #16).

The COD value obtained for the effluent prior to treatment was 75 mg/L. The COD value obtained for the effluent at various stages during treatment is provided in Table 1.

The total residence time of the effluent in the channel of each electrolytic cell was determined to be approximately 15 seconds.

TABLE 1

| Number of Electrolytic Cells | COD (mg/L) | % COD Reduction | Cumulative % Reduction |
| --- | --- | --- | --- |
| 30 | 38 | 49.3 | 49.3 |
| 60 | 35 | 7.9 | 53.3 |
| 90 | 14 | 60.0 | 81.3 |
| 120 | 12 | 14.3 | 84.0 |
| 150 | <1 | >99 | >99 |
| 180 | <1 | >99 | >99 |

EXAMPLE 2

An effluent sample from the source described in Example 1 was treated in a system comprising a single coaxially arranged electrolytic cell similar to the electrolytic cells described above in Example 1. This single electrolytic cell was vertically disposed in a tank in manner similar to that illustrated in FIG. 6 of U.S. Pat. No. 5,108,563. The anode and the cathode were identical to those described in Example 1 above.

Effluent was continuously flowed through the tank at a rate of 10 mL/anode inch/minute as in Example 1 which corresponded to a flow rate through the channel defined by the electrolytic cell equivalent to 45 mL/min. The volume of effluent in the tank at any one time was 1.6 L and 4.5 inches of the electrodes was immersed in the effluent.

The amperage applied to the electrodes was the same as that applied in Example 1 (30 mamps/sq.in).

Again, the COD of the initial sample was determined as well as the COD after given periods of treatment. The results obtained are reported in Table 2.

TABLE 2

| Time (minutes) | COD (mg/L) | % COD Reduction | Cumulative % Reduction |
| --- | --- | --- | --- |
| 0 | 75 | — | — |
| 30 | 37 | 50.7 | 50.7 |
| 60 | 27 | 27.0 | 64.0 |
| 80 | 24 | 11.1 | 68 |

After 80 minutes equilibrium of the effluent was attained and no further reduction of COD was observed. Thus, the desired COD of <1 mg/L was not attainable using a continuous flow method in which the effluent flow was not controlled as regards contact with the channel defined by the electrolytic cell.

What is claimed is:

1. A process for treatment of a fluid in need of treatment, the process comprising the steps of:

(i) feeding the fluid in need of treatment to a fluid treatment chamber having a fluid inlet and a fluid outlet;
    (ii) passing the fluid in need of treatment through the fluid inlet into the treatment chamber;
    (iii) disposing at least one electrolytic cell substantially transverse to the flow of fluid, the electrolytic cell comprising a channel defined by an outer, fluid permeable first electrode and an inner, coaxially disposed second electrode;
    (iv) substantially filling the cross-section of the housing with the at least one electrolytic cell;
    (v) forcing substantially all of the fluid in need of treatment through the least one fluid permeable electrolytic cell;
    (vi) applying a current density of from about 4 to about 80 milliamps/in$^2$ to each electrolytic cell;
    (vii) subjecting the fluid in need of treatment to electrolysis as it passes through the channel;
    (viii) forcing the fluid to the fluid outlet; and
    (ix) allowing the fluid to exit the fluid outlet.

2. The process defined in claim 1, wherein the electrolytic cells are disposed substantially horizontally and the fluid is forced to flow in a substantially vertical direction.

3. The process defined in claim 1, wherein the first electrode comprises a plurality of apertures.

4. The process defined in claim 1, wherein the second electrode is free of apertures.

5. The process defined in claim 1, wherein the second electrode is solid.

6. The process defined in claim 1, wherein the first electrode and the second electrode have substantially the same cross-sectional shape.

7. The process defined in claim 1, wherein the first electrode and the second electrode have a substantially circular cross-sectional shape.

8. The process defined in claim 7, wherein the ratio of the diameter of the first electrode to the diameter of the second electrode is in the range of from about 1.10 to about 3.50.

9. The process defined in claim 7, wherein the ratio of the diameter of the first electrode to the diameter of the second electrode is in the range of from about 1.10 to about 1.75.

10. The process defined in claim 7, wherein the ratio of the diameter of the first electrode to the diameter of the second electrode is in the range of from about 1.10 to about 1.30.

11. The process defined in claim 1, further comprising post-treatment of the fluid to remove precipitated material contained therein.

12. The process defined in claim 11, wherein the post-treatment comprises the steps of:

(vii) coagulating precipitated material in the fluid;
    (viii) allowing coagulated precipitated material to settle and decanting the fluid; and
    (ix) filtering the fluid.

13. The process defined in claim 1, wherein the first electrode is fabricated from stainless steel.

14. The process defined in claim 1, wherein the second electrode is fabricated from stainless steel.

15. The process defined in claim 1, wherein the second electrode consists of iron.

16. The process defined in claim 1, wherein the fluid is water.

17. A fluid treatment apparatus comprising a housing including a fluid inlet, a fluid outlet and at least one fluid permeable electrolytic cell disposed therebetween such that the flow of fluid from the fluid inlet to the fluid outlet is substantially transverse to the at least one electrolytic cell, the at least one electrolytic cell: (i) comprising a channel defined by an outer, fluid permeable first electrode and an inner, coaxially disposed second electrode, and (ii) substantially completely filling the cross-section of the housing such that the only path of fluid from the fluid inlet to the fluid outlet is through the at least one electrolytic cell.

18. The apparatus defined in claim 17, wherein the housing comprises a plurality of electrolytic cells disposed between the fluid inlet and the fluid outlet.

19. The apparatus defined in claim 17, wherein the electrolytic cells are disposed substantially horizontally and the fluid is forced to flow in a substantially vertical direction.

20. The apparatus defined in claim 17, wherein the first electrode comprises a plurality of apertures.

21. The apparatus defined in claim 17, wherein the second electrode is free of apertures.

22. The apparatus defined in claim 17, wherein the second electrode is solid.

23. The apparatus defined in claim 17, wherein the first electrode and the second electrode have substantially the same cross-sectional shape.

24. The apparatus defined in claim 17, wherein the first electrode and the second electrode have a substantially circular cross-sectional shape.

25. The apparatus defined in claim 24, wherein the ratio of the diameter of the first electrode to the diameter of the second electrode is in the range of from about 1.10 to about 3.50.

26. The apparatus defined in claim 24, wherein the ratio of the diameter of the first electrode to the diameter of the second electrode is in the range of from about 1.10 to about 1.75.

27. The apparatus defined in claim 24, wherein the ratio of the diameter of the first electrode to the diameter of the second electrode is in the range of from about 1.10 to about 1.30.

28. The apparatus defined in claim 17, further comprising means for post-treatment of the fluid to remove precipitated material contained therein.

29. The apparatus defined in claim 28, wherein the means for post-treatment comprises:

(vii) means for coagulating precipitated material in the fluid;

(viii) means for allowing coagulated precipitated material to settle and means for decanting the fluid; and (ix) means for filtering the fluid.

30. The apparatus defined in claim 17, wherein the first electrode is fabricated from stainless steel.

31. The apparatus defined in claim 17, wherein the second electrode is fabricated from stainless steel.

32. The apparatus defined in claim 17, wherein the second electrode consists of iron.

33. The apparatus defined in claim 17, wherein each first electrode in the electrolytic cells is disposed between a pair of opposed mounting bars to form a ladder which is disposed in the housing.

34. The apparatus defined in claim 33, wherein each of the mounting bars comprises first apertures therein to receive the first electrode.

35. The apparatus defined in claim 34, wherein each of the first apertures contains a spacer.

36. The apparatus defined in claim 35, wherein the spacer is a bushing and the mounting bars are pressure fitted to each first electrode.

37. The apparatus defined in claim 33, wherein the housing comprises apertures through which each second electrode can be inserted.

38. The apparatus defined in claim 37, wherein the ladder is disposed in the housing such that the first apertures and second apertures are positioned to allow insertion of the second electrode therethrough.

39. The apparatus defined in claim 33, wherein two or more of the ladders are disposed in the housing.

40. A water treatment apparatus comprising a housing including a water inlet, a water outlet and at least one water permeable electrolytic cell disposed therebetween such that the flow of water from the water inlet to the water outlet is substantially transverse to the at least one electrolytic cell, the at least one electrolytic cell: (i) comprising a channel defined by an outer, fluid permeable first electrode and an inner, coaxially disposed second electrode, and (ii) substantially completely filling the cross-section of the housing such that the only path of fluid from the fluid inlet to the fluid outlet is through the at least one electrolytic cell.

* * * * *